United States Patent [19]

Noponen

[11] Patent Number: 5,436,808
[45] Date of Patent: Jul. 25, 1995

[54] HEADLAMP

[75] Inventor: Seppo Noponen, Nivala, Finland

[73] Assignee: Transducer Valley Inc., Nivala, Finland

[21] Appl. No.: 137,181

[22] PCT Filed: Feb. 29, 1992

[86] PCT No.: PCT/FI92/00125
§ 371 Date: Oct. 27, 1993
§ 102(e) Date: Oct. 27, 1993

[87] PCT Pub. No.: WO92/19908
PCT Pub. Date: Nov. 12, 1992

[30] Foreign Application Priority Data

Apr. 30, 1991 [FI] Finland .................. 912095
Jul. 12, 1991 [FI] Finland .................. 913378

[51] Int. Cl.$^6$ .................................. F21M 3/16
[52] U.S. Cl. .......................... 362/61; 362/32; 362/298; 362/300
[58] Field of Search ........... 362/32, 61, 298, 299, 362/300, 346

[56] References Cited

U.S. PATENT DOCUMENTS

| | | | |
|---|---|---|---|
| 2,254,961 | 8/1937 | Harris | 240/106.1 |
| 2,516,377 | 7/1950 | Fink | 362/298 |
| 2,993,987 | 7/1961 | Diffie | 362/298 |
| 4,389,698 | 6/1983 | Cibie | 362/32 |
| 4,441,783 | 4/1984 | Houghton et al. | 362/300 |
| 4,631,642 | 12/1986 | Brun | 362/32 |
| 4,816,582 | 4/1990 | Sultan et al. | 362/32 |
| 5,257,168 | 10/1993 | Davenport et al. | 362/32 |

FOREIGN PATENT DOCUMENTS

3542292A1 11/1985 Germany .
683747 3/1951 United Kingdom .

*Primary Examiner*—Richard R. Cole
*Attorney, Agent, or Firm*—Pollock, Vande Sande & Priddy

[57] ABSTRACT

A headlamp, particularly for vehicles. The headlamp includes a solid piece body formed from a transparent material. The body includes a first, light transmitting surface portion. At least a first and a second opaque mirror surface are disposed on opposite sides of a second surface portion of the body. The first mirror surface is shaped to produce a desired distribution of reflected light on the second mirror surface; the second mirror surface is shaped to produce a desired reflected light distribution in an area illuminated by the headlamp. Light from at least one light source is directed to the first mirror surface, reflected by the first mirror surface to the second mirror surface, and then reflected by the second mirror surface through the light transmitting surface.

25 Claims, 1 Drawing Sheet

HEADLAMP

FIELD OF THE INVENTION

The invention relates to a headlamp for a vehicle.

BACKGROUND OF THE INVENTION

Vehicle headlamps are placed as low as possible so that glare from oncoming vehicles is minimized. Light beams from headlamps can not however be directed too low because light that is reflected, especially from a wet road surface, causes glare to the eyes of the driver of an oncoming vehicle. Also fog, rain or snowfall that is illuminated by the headlamps of a vehicle may reduce visibility. In this case, light is reflected from raindrops or snowflakes to the eyes of the driver and prevents him from seeing far-away objects on the road.

Presently headlamps of vehicles are structurally alike and function according to the same principle. Typically they have a housing with a light bulb, reflector and protective glass. The bulb of the headlamp has two filaments, one of them, a filament for distant lights, is disposed at the focus of a parabolic mirror surface and, in a corresponding way, the others a filament for dip lights, is disposed a few millimeters in front of the focus. All light beams of the distant light, which come from the focus, are reflected by the mirror surface in a direction parallel with the focal axis. In a corresponding way, all beams of the dip light, which come from the front of the focus, are reflected downwards towards the focal axis.

The function of the protective glass is to serve as a diffusor for the thin light cone that comes from the reflector so that one obtains a desired light distribution. Therefore, the protective glass is provided with different kinds of grooves which cause the light cone to spread. The housing is either spherical or, depending on the motorcar, rectangular or has some other form. The design of present motorcars requires a broad and flat shape of the headlamp.

Headlights which have a sealed structure are also used as headlamps. The sealed housing is filled with gas and and the filaments are free. These, so-called Sealed-Beam lights, are used especially in the United States, UK and Japan.

Conventional headlamps have following drawbacks which are due to their structure and their principle of operation. The metal coating of the mirror surface on the inner surface of the housing is continuously exposed to air. This leads to gradual darkening of the metal coating and reduction in the luminous efficiency of the headlamp. For instance, humidity and impurities penetrate into the housing through an opening which is used for installing the bulb. Also, the headlamp is easily broken. For instance, one hit of a stone can break the headlamp so that it can not be used anymore. Furthermore possiblities to change direction of the light cone are limited. Additionally changing of the direction of the light by means of the protective glass is difficult and impractical because scattering, energy losses and glare, always takes place within the glass-air boundary surface.

The German Offennlegungsschrift 3 542 292 presents a signal lamp for a vehicle. The lamp comprises an elongated body made of a solid material. The front surface of the body forms the light transmittal surface of the lamp and the rear surface is provided with V-shaped grooves. The side of the V shaped grooves facing the light source is made light reflecting, thus forming a mirror surface. Light coming from the source along the body is reflected by the mirror surface. The reflected light then proceeds through the light transmitting surface.

There are drawbacks with this kind of lamp. It is difficult to shape the lamp so that the light transmitting surface can be brought downwardly near the road surface. It is also difficult to produce a headlamp that would make changing of the direction of the front light possible

SUMMARY OF THE INVENTION

It is the objective of the present invention to provide a headlamp in which the mirror surface remains untarnished, which is impact resistant and which produces a light cone of such a shape that causes no glare and that illuminates the road sufficiently.

The most important advantages which are achieved by the headlamp of this invention are the following. Structurally, a solid headlamp is impact resistant and does not break so easily as a headlamp with a housing. The headlamp needs no inner mirror surfaces. The mirror surfaces are preferably situated on the outside surface of the headlamp. Surface losses of luminosity are small due to the solid glass or plastic structure. The surface of the headlamp can be hardened to resist impacts and the battered surface can be repolished clear again. The headlamp can be manufactured by a simple molding technique. The headlamp needs a small space and it can be placed for example into the bumper of a vehicle.

In a headlamp according to the invention, two mirror surfaces are used which are both shaped to produce a desired light distribution or a desired distribution of reflected light. In this context, the term light distribution is defined as the light intensity in different points of the three-dimensional space and the term illuminated area as the area or space outside that is generally in front of the headlamp. Furthermore, the bulb is placed in a recess, or the like, which is provided with a hole reflector for directing the light from the bulb onto the mirror surface. This provides the following additional advantages. Through shaping of the mirror surfaces of the headlamp, the light cone can be very easily formed in a desired way, for instance, to obtain an unsymmetric light cone for dip lights. Desired special targets, like the road side, can be illuminated by the headlamp. Several bulbs can be disposed in the same headlamp. Also, the headlamp can have areas for example for direction indicator and for extreme lights. Changing of the bulb is also easy. Furthermore, by using two mirror surfaces the body can be shaped flat or thin, as seen from the side, and broad as seen from above. Then the radiating surface may be brought downwardly close to the road surface.

In a conventional headlamp, the light distribution on the illuminated area is obtained by patterning of the protective glass that functions as the diffusor of the light.

In the headlamp according to the invention the light distribution is obtained by the shaping of the mirror surface. Due to the shaping of the mirror surface, the whole light transmitting surface of the headlamp does not look bright because different areas of the mirror surface are shaped to direct light in different directions and, therefore, there is less glare.

BRIEF DESCRIPTION OF THE DRAWINGS

The invention will now be described in the following referring to the enclosed drawings in which.

DETAILED DESCRIPTION OF THE INVENTION

Figure 1:
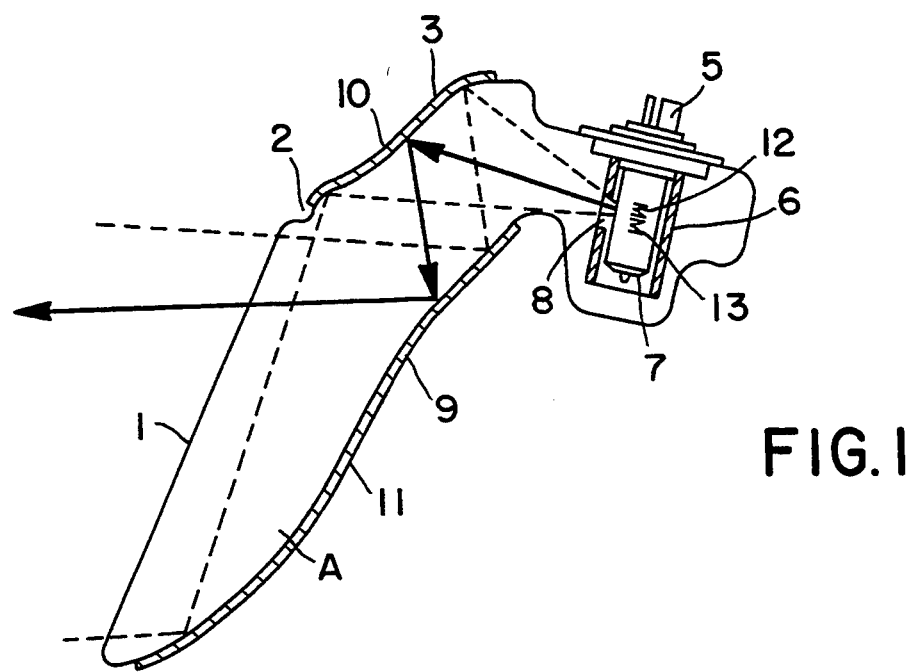
FIG. 1 shows a vertical cross-sectional view of an embodiment of a head-lamp, according to the present invention.

The headlamp of the motorcar comprises a body A of the headlamp, which body A is made of a transparent material, like optical glass or a corresponding plastic and is suitably shaped and which is preferably manufactured by molding. The body A is shaped so that its first surface portion forms, in the exemplary case, an oblique light transmitting surface 1. On the second side of the body A, in the upper part of the device, there is a cylindrical recess 7 in which the light source 5 and, in the exemplary case, a tubular metallic hole reflector for directing the light are placed. At least the wall of the recess 7 that is nearest to the mirror surface 3 is polished for preventing light losses. The bulb is installed in the recess 7 from above without any obstacles. The body A has a groove 2 shaped thereon above the light transmitting surface 1 the edge of the hood of the motorcar fits against the groove when the device of the invention is installed in the motorcar.

Since the body A is totally a piece of solid material, light from the light source, when proceeding through the body, must pass through only one air-glass boundary surface and only one glass-air boundary surface. In the exemplary case, light from the light source 5 propagating through the body meets the first boundary surface at the back of the body A in front of the light source and the and the second boundary surface at the level of said light transmitting surface 1. Between these boundary surfaces light is reflected by two mirror surfaces that is the first mirror surface 3 and the second mirror surface 9. According to FIGS. 1 and 2 the mirror surfaces 3 and 9 are formed on or fixed to the second surface portion of the body A bordering the light transmitting surface 1. In the example, the first mirror surface 3 is formed on the upper side of the body A above the light transmitting surface 1 and the groove 2 and the second mirror surface 9 is formed on the lower side of the body A.

It is advantageous to protect the outside of the exposed light transmitting surface 1 of the headlamp by some transparent material 10 and 11 for example hard plastic, to protect it from hitting stones. Other parts of the body can be for example painted using some hard paint or coated with some other suitable material like, for instance, plastic.

Mirror surfaces 3 and 9 which are opaque, can be made by evaporative deposition of suitable materials on specific parts of the molded body. The mirror surfaces can be for example thin layers of aluminium or silver which are covered with a layer of hard plastic to prevent the mirror surface from breaking. Mirror surfaces 3 and 9 can also be formed of strips or pieces in which case the depth of the headlamp can be very small.

The light source 5, which is placed in the hole 7, comprises a bulb installed in a protected lampholder. The bulb is installed, in the example, inside a tubular hole reflector 6. The hole reflector 6 has a light opening 8 which directs the light from the light source 5 in a desired direction and therefore defines the true size of the light source. The inner surface of the hole reflector 6 is polished or foliated to prevent light losses within the hole reflector 6.

Figure 2:
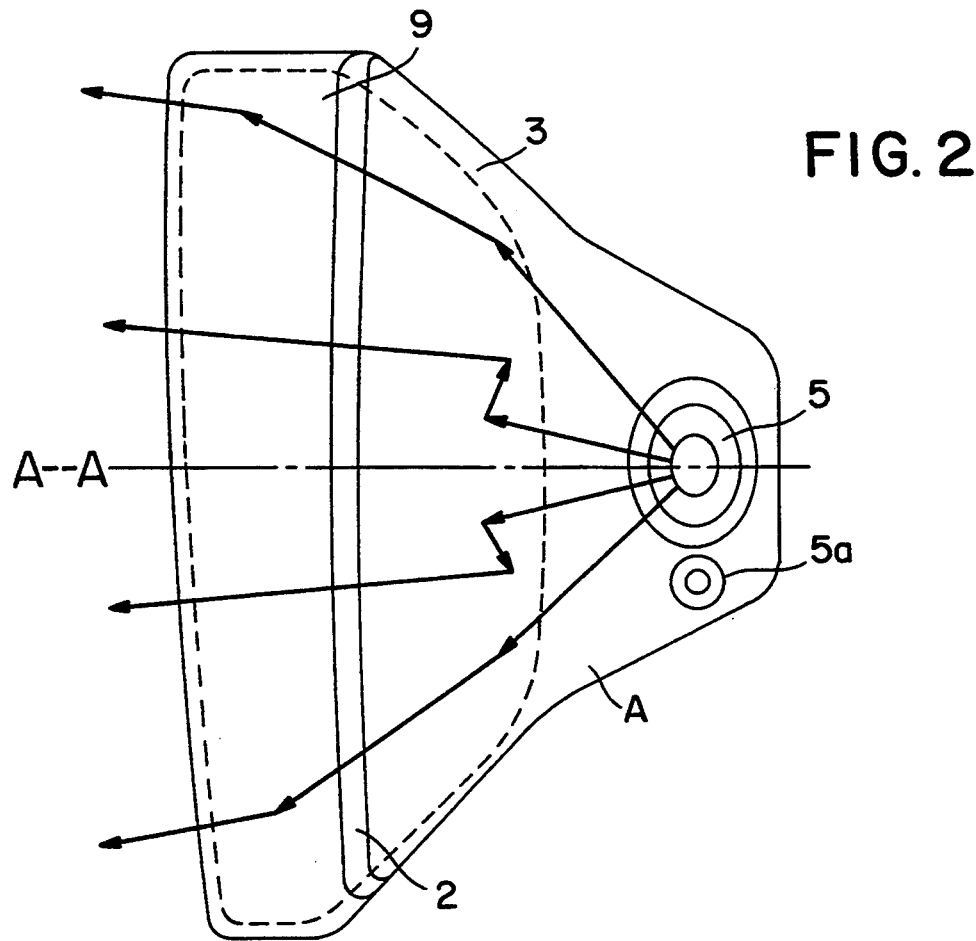
FIG. 2 shows an overhead view of embodiment of the headlamp shown in FIG. 1.

Mirror surfaces 3 and 9 are shaped so that light which comes through the light opening 8 is reflected by the first mirror surface 3 to the second mirror surface 9 from which light is directed to the illuminated target through the light transmitting surface 1. Mirror surfaces 3 and 9 are shaped so that essentially all light transmitted from the light source 5 to the first mirror surface 3 is reflected to the second mirror surface 9 from which essentially all light is reflected to the illuminated area. Shaping of the mirror surface is known in itself and is based on the utilization of the physical laws known from optics concerning reflection and refraction of light. Therefore, it is possible to calculate numerically such a suitable shape for the mirror surface that produces a desired light distribution when the light distribution that comes to the mirror surfaces is known. FIGS. 1 and 2 show one example of the directions of the light beams which propagate via the first and the second mirror surface. The light opening 8 of the hole reflector 6 and the first and the second mirror surface 3 and 9 are placed and shaped so that the headlamp produces a desired light distribution on the illuminated area that is giving desired direction and shape of the light cone and the spacial intensity of light. Therefore, by shaping the mirror surfaces 3 and 9 in a suitable way, the light cone can be directed in a desired way and the light intensity can be arranged so that the light intensity has a suitable magnitude at any specific point.

The bulb of the headlamp contains two separate filaments 12 and 13 one for dip lights and one for distant lights. When dip lights are used, light produced by the filament is directed through the opening 8 of the hole reflector 6 to the first mirror surface 3 for example to the upper part thereof. Therefrom light is reflected for example to the upper part of the second mirror surface 9, which is shaped so that it reflects light downwards. Thus, glare to the eyes of the oncomers is reduced or totally prevented. In a corresponding way, when distant lights are used, light from the filament for distant lights is conveyed via mirror surfaces 3 and 9 so that the light leaving the headlamp is directed farther away.

In the exemplary case, a parabolic reflector of the bulb is not needed at all because the hole reflector directs the light in an appropriate way. If a bulb that produces directed light is used as the light source there is no freed to use a hole reflector 6. The device can be provided with several light sources 5 which function, for example as direction indicators or other attentional lights.

The invention is not limited to the above embodiment but it can be varied within the limits of the enclosed claims. For instance light from the light source can be reflected for example by one or e.g. by three mirror surfaces. The mirror surfaces can also be disposed inside the body. It is also possible to install several light sources 5, 5a in the headlamp which have their own mirror surfaces. The headlamp according to the invention can also be used in other applications than in motorcars. In this case, the applications in question are for instance control and location systems used in industrial plants, aircraft lights among other applications.

I claim:

1. A headlamp, particularly for vehicles, comprising:

a solid piece body formed from a transparent material, the body including a first, light transmitting surface portion;

at least a first and a second opaque mirror surface disposed on opposite sides of a second surface portion of the body, the first mirror surface being shaped to produce a desired distribution of reflected light on the second mirror surface, the second mirror surface being shaped to produce a desired reflected light distribution in an area illuminated by the headlamp; and at least one light source, wherein light from the at least one light source is directed to the first mirror surface, reflected by the first mirror surface to the second mirror surface, and then reflected by the second mirror surface through the light transmitting surface.

2. A headlamp according to claim 1, wherein:
the body is optical glass or plastic.

3. A headlamp according to claim 1, wherein: the body is formed by molding.

4. A headlamp according to claim 1, wherein:
the mirror surfaces are made from a layer of a light reflective material.

5. A headlamp according to claim 4, wherein:
the mirror surfaces are formed by evaporative deposition of the light reflective material.

6. A headlamp according to claim 5, wherein:
the light reflective material is silver or aluminum.

7. A headlamp according to claim 4, further comprising:
a layer of a protective material for protecting the mirror surfaces.

8. A headlamp according to claim 7, wherein:
the protective layer is an impact resistant material.

9. A headlamp according to claim 8, wherein:
the impact resistant material is plastic.

10. A headlamp according to claim 1, wherein:
the at least one light source is arranged in a recess formed inside the body.

11. A headlamp according to claim 10, wherein:
the at least one light source is a light bulb.

12. A headlamp according to claim 10, further comprising:
a light source for dip lights and a light source for distance lights.

13. A headlamp according to claim 12, wherein:
the at least one light source is a light bulb, the light bulb including a filament for distant lights and a filament for dip lights.

14. A headlamp according to claim 13, wherein:
the opening in the hole reflector is arranged to direct light essentially to different parts of the mirror surfaces, thereby producing an essentially downwardly directed light cone when dip lights are used, and an essentially horizontally directed light cone when distant lights are used.

15. A headlamp according to claim 10, further comprising:
a plurality of light sources, wherein at least one of the light sources is arranged to function as an attention light.

16. A headlamp according to claim 15, wherein:
said attention light is a direction indicator or a hazard light.

17. A headlamp according to claim 9, further comprising:
a hole reflector placed in association with the at least one light source, the hole reflector including at least one opening that is arranged to direct light produced by the at least one light source in a desired way.

18. A headlamp according to claim 17, wherein:
the at least one light source is a light bulb and the light bulb includes a filament for distant lights and a filament for dip lights.

19. A headlamp according to claim 18, wherein:
the opening in the hole reflector is arranged to direct light essentially to different parts of the mirror surfaces, thereby producing an essentially downwardly directed light cone when dip lights are used, and an essentially horizontally directed light cone when distant lights are used.

20. A headlamp according to claim 17, further comprising:
a light source for dip lights and a light source for distance lights.

21. A headlamp according to claim 20, wherein:
the at least one light source is a light bulb, the light bulb including a filament for distant lights and a filament for dip lights.

22. A headlamp according to claim 21, wherein:
the opening in the hole reflector is arranged to direct light essentially to different parts of the mirror surfaces, thereby producing an essentially downwardly directed light cone when dip lights are used, and an essentially horizontally directed light cone when distant lights are used.

23. A headlamp according to claim 1, further comprising:
a light source for dip lights and a light source for distance lights.

24. A headlamp according to claim 1, further comprising:
a plurality of light sources, wherein at least one of the light sources is arranged to function as an attention light.

25. A headlamp according to claim 4, wherein:
said attention light is a direction indicator or a hazard light.

* * * * *